US009877056B1

(12) United States Patent
Misherghi

(10) Patent No.: US 9,877,056 B1
(45) Date of Patent: Jan. 23, 2018

(54) COMPRESSED MEDIA WITH STILL IMAGES SELECTED FROM A VIDEO STREAM

(71) Applicant: Google Inc., Mountain View, CA (US)

(72) Inventor: Summer Misherghi, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/348,690

(22) Filed: Nov. 10, 2016

(51) Int. Cl.

| | |
|---|---|
| ***H04N 21/238*** | (2011.01) |
| ***H04N 21/2662*** | (2011.01) |
| ***H04N 21/2343*** | (2011.01) |
| ***G11B 27/30*** | (2006.01) |
| ***H04N 21/439*** | (2011.01) |
| ***H04N 21/4402*** | (2011.01) |
| ***H04N 21/262*** | (2011.01) |

(52) U.S. Cl.
CPC ..... *H04N 21/2662* (2013.01); *G11B 27/3036* (2013.01); *H04N 21/234309* (2013.01); *H04N 21/234345* (2013.01); *H04N 21/26258* (2013.01); *H04N 21/4398* (2013.01); *H04N 21/440218* (2013.01); *H04N 21/440245* (2013.01)

(58) Field of Classification Search
CPC .................................................... H04N 21/238
See application file for complete search history.

(56) References Cited

U.S. PATENT DOCUMENTS

2001/0047517 A1* 11/2001 Christopoulos ........... G06T 1/00 725/87
2006/0025149 A1* 2/2006 Karaoguz .......... H04N 21/4126 455/452.2

OTHER PUBLICATIONS

Youtube, Video for Doctor who The Power of the Daleks Episode 2 Talking Telesnaps Part 2, Apr. 10, 2016, 1 Page, Retrieved on Jun 8, 2016, Can be retrieved from the internet <URL:https://www.youtube.com/watch?v=j92g-ECysiA>.

* cited by examiner

*Primary Examiner* — Hunter B Lonsberry
(74) *Attorney, Agent, or Firm* — Young Basile Hanlon & MacFarlane, P.C.

(57) ABSTRACT

A video hosting service receives and processes a source video to generate an efficiently compressed media file. The source video is transcoded to an intermediate video and corresponding audio. The video hosting service selects a subset of video frames from the intermediate video as still images and identifies the timing information associated with each selected still image. The selection process may be dependent on information associated with the video such as a video classification. The video hosting service encodes the selected still images and the audio data of the source video, and generates a compressed media file for transmission to a client device. The compressed media file does not include motion data associated with the selected still images to reduce the size of the compressed media file. A client device receives the compressed media file and plays the still images and associated audio data.

20 Claims, 6 Drawing Sheets

COMPRESSED MEDIA WITH STILL IMAGES SELECTED FROM A VIDEO STREAM

BACKGROUND

This disclosure generally relates to video content delivery, and more specifically, to efficient delivery of compressed media having selected video frames as still images from a source video and corresponding audio for playback on client devices, particularly on those client devices having limited computing capabilities and network bandwidth.

Video hosting services, such as YOUTUBE, receive and store numerous videos from users or third parties. Additionally, these video hosting services provide the videos through the Internet for user consumption. In many scenarios, a user uses a client device to stream the video. In other words, the client device simultaneously displays the downloaded portions of the video while continuing to download subsequent portions of the video. Thus, a user can begin consuming the content of a video immediately after sending a request for the video and watch the entirety of the video without interruption.

However, the transmission of larger video files requires significant network resources (e.g. bandwidth) and may be prohibitively expensive for some users in some geographical locations, who do not have access to the required network resources. Additionally, continuous streaming of videos requires significant resources of the client device (e.g. power consumption, computer processing power). In many environments, these resources (e.g. bandwidth, money, client device capabilities) may be significantly limited. For example, certain countries may not yet have the infrastructure required for high-speed data transfer over the Internet. Additionally, certain client devices (e.g. cell phones) may not be able to effectively playback and download a video simultaneously. For these reasons a slow transfer of video files from a video hosting service to the client device may occur. This may result in video stuttering during playback and/or a sub-optimal video viewing experience for the user on the client device. Thus, in limited resource environments, an alternative solution is required.

SUMMARY

A video hosting service transmits compressed media through a network for playback by client devices. The video hosting service receives a source video from a user or third party associated with the video hosting service. The source video has an associated audio track comprising multiple audio frames. In some scenarios, the source video also has a video classification that describes the content of the source video, e.g., "slow motion" for a slow motion lecture presentation or "fast motion" for a football game with fast paced movements. A still image presentation module of the video hosting service processes the source video to be sent to the client device. For example, the source video is transcoded into an intermediate video and a subset of the video frames are selected as still images for encoding, whereas the motion information associated with the selected video frames are not encoded. In some embodiments, the selection of the still images may occur in a fixed interval such that every Nth video frame is selected as a still image. In other embodiments, the still images may be selected from the video frames in varying intervals based on information regarding the content of the source video (e.g. video classification).

Depending on which video frames are selected as still images, the corresponding audio track is accordingly processed, e.g., audio frames being encoded according to a suitable audio encoding scheme. For example, if the first and fourth video frames of the source video are selected as still images, then the audio data corresponding to the first, second, and third frames are derived and associated with the first selected still image. The video hosting service encodes the selected still images and the selected audio data and sends them as a compressed media file to the client device. A client device receives the compressed media and decodes the still images and audio data. Once decoded, the still images and the audio may be played on a display of the client device for consumption by a user.

In comparison to the original source video, the compressed media is smaller in size. Therefore, the compressed media uses significantly less bandwidth when being transferred through the network to the client device. Additionally, the smaller size of the compressed media utilizes fewer resources on the client device for playback. The solution provided by this disclosure may be valuable in environments of limited bandwidth or computing resources.

Alternatively, a user of a client device may prefer consuming the selected still images and associated audio data as opposed to the full source video due to its primitive feel and ability to playback the selected images in a flip-book movie format.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
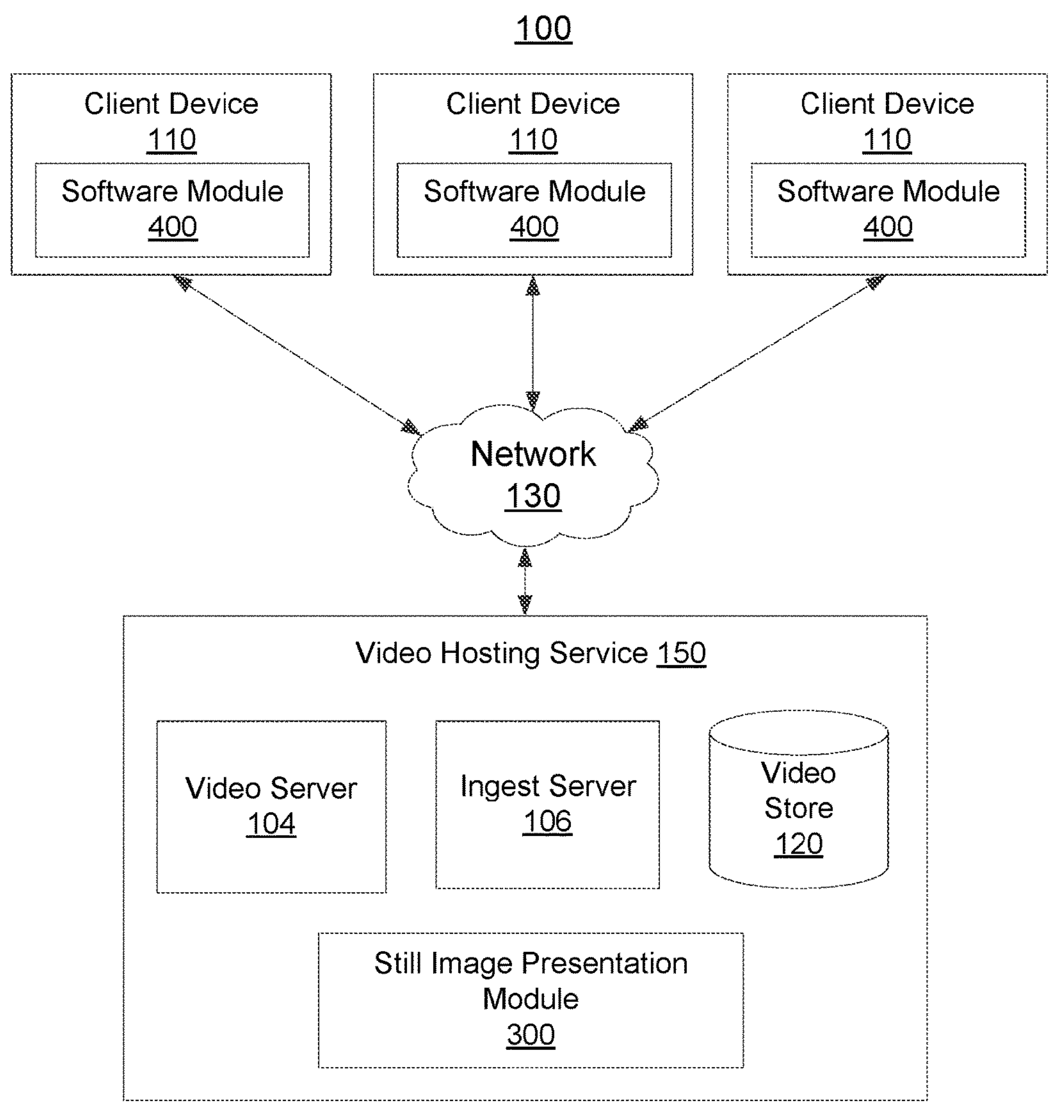
FIG. 1 is a system environment of an online system including a video hosting service, in accordance with an embodiment.

FIG. 1 depicts a system environment 100 of an online system including a video hosting service 150, in accordance with an embodiment. The system environment 100 includes one or more client devices 110, a network 130, and a video hosting service 150.

Turning to the individual entities illustrated on FIG. 1, each client device 110 is used by a user to request video hosting services. For example, a user uses a client device 110 to send a request for uploading a video for sharing, or playing back a video. A client device 110 is a computing device with a software module 400 that transmits and/or receives data via the network 130. Examples of client devices 110 include desktop computers, laptop computers, tablet computers (pads), mobile phones, personal digital assistants (PDAs), gaming devices, or any other electronic device including computing functionality and data communication capabilities. The client device 110 typically includes a processor, a display device (or output to a display device), a local storage, such as a hard drive or flash memory device, to which the client device 110 stores data used by the user in performing tasks, and a network interface for coupling to the video hosting service 150 via the network 130. Additionally or alternatively, specialized application software that runs native on a mobile device is used as an interface to connect to the network 130.

The network 130 facilitates communications amongst one or more client devices 110 and the video hosting service 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

The video hosting service 150 further possesses a video server 104, ingest server 106, video store 120 and still image presentation module 300. The video hosting service 150 is connected with the network 130 to communicate with the one or more client devices 110. For example, the video hosting service 150 sends a compressed media file (i.e. encoded still images and encoded audio data) through the network 130 to the client devices 110 for consumption (e.g., playing back). The video server 104 serves the videos from the video store 120 in response to user video requests. The ingest server 106 receives user/third party provided videos and stores the videos in the video store 120. The still image presentation module 300 is responsible for processing a source video to generate a compressed media file for sending to the client devices 110.

Generation of Compressed Media

Figure 2:
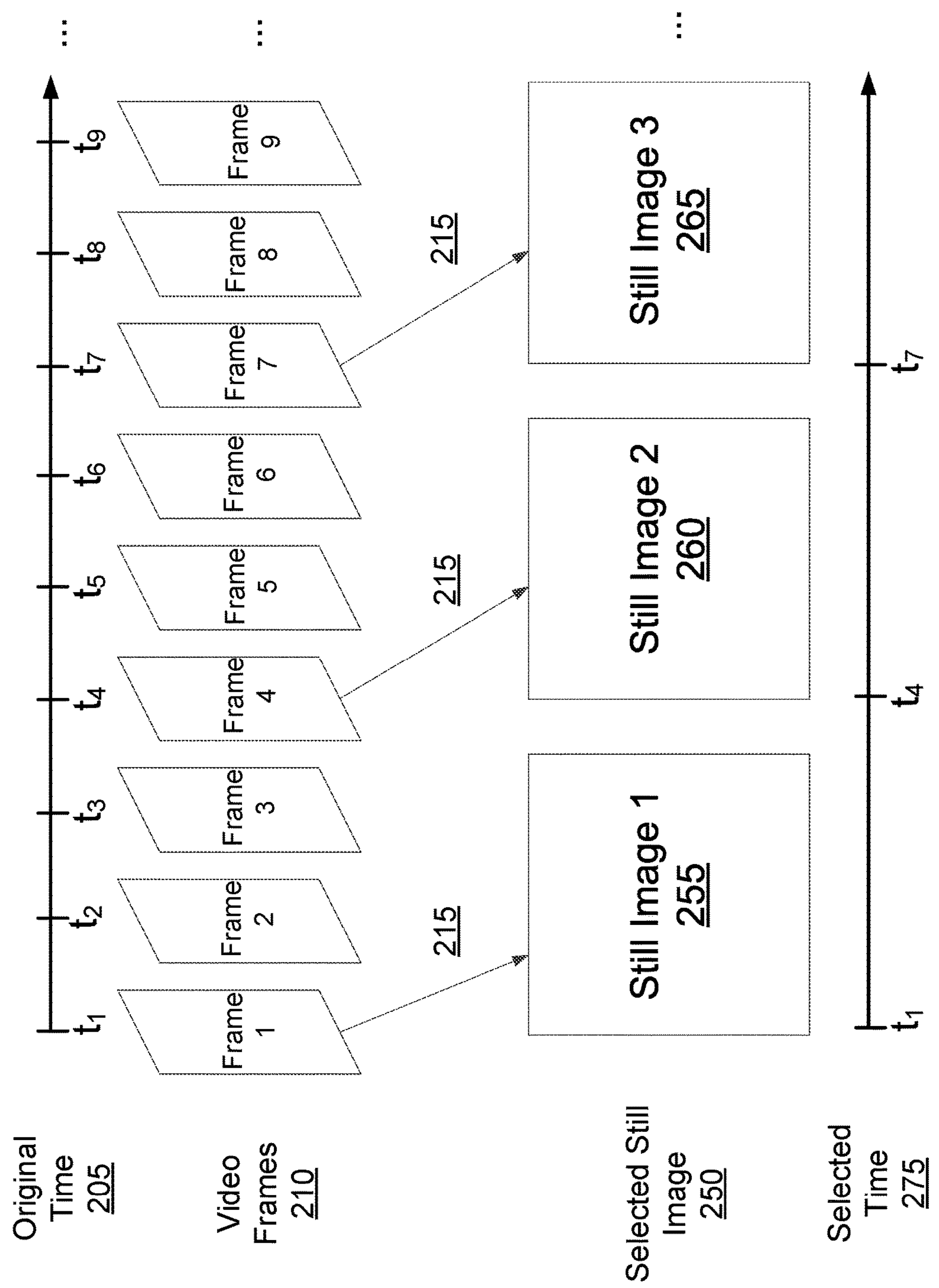
FIG. 2 is an example illustration of the selection of a subset of video frames as still images from a source video, in accordance with an embodiment.
Figure 3:
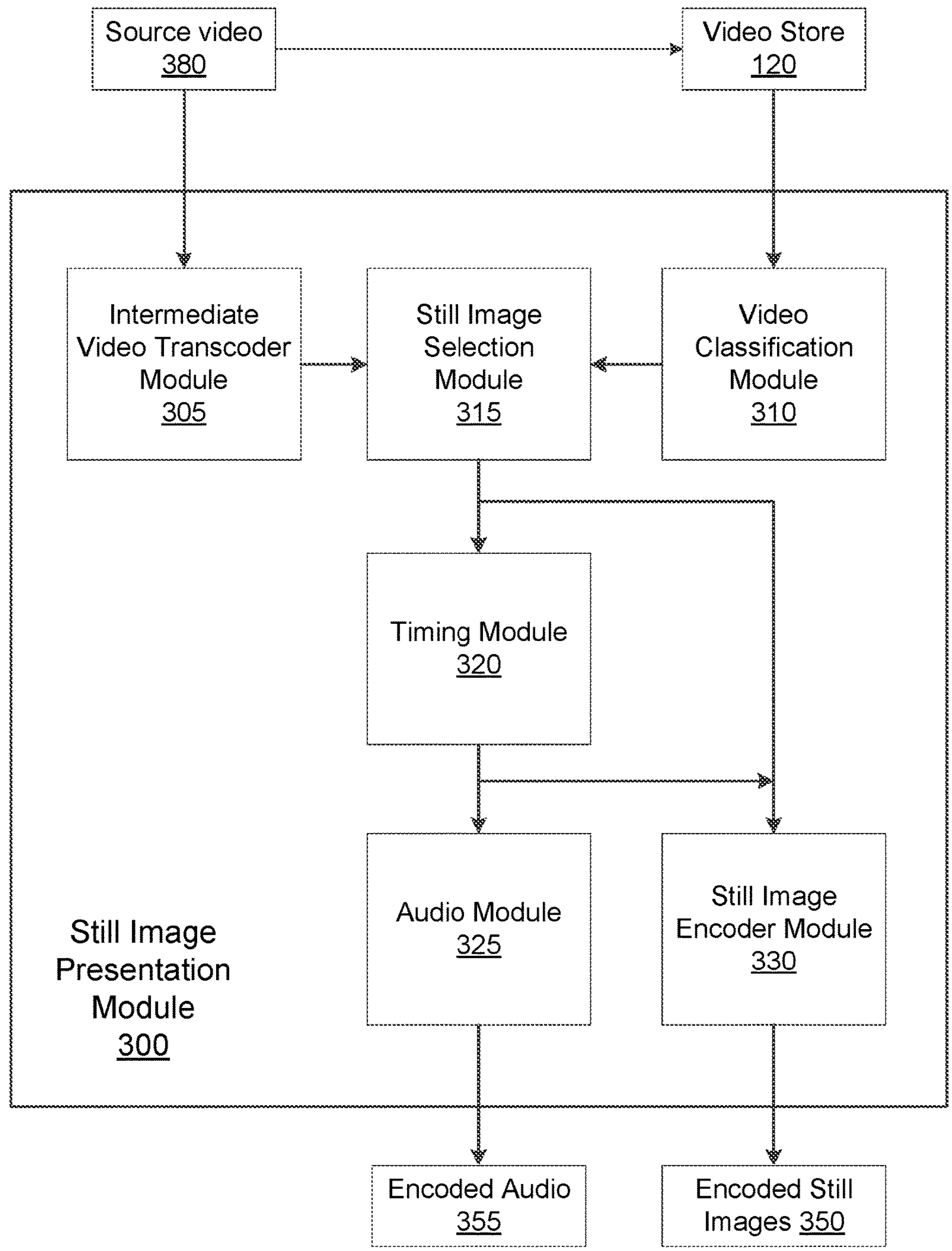
FIG. 3 is a flow diagram of a still image presentation module on a video hosting service, in accordance with an embodiment.

FIG. 2 is an example illustration of the selection of a subset of video frames as still images from a source video, in accordance with an embodiment. The selected still images 250 are selected from video frames 210 of the source video along with original time 205 information by a still image presentation module, e.g., a still image presentation module 300 on the video hosting service 150 as shown in FIG. 3. FIG. 3 is a flow diagram of the still image presentation module 300 on the video hosting service 150, in accordance with an embodiment. In one embodiment, the still image presentation module 300 includes an intermediate video transcoder module 305, a video classification module 310, a still image selection module 315, a timing module 320, an audio module 325, and a still image encoder module 330.

The intermediate video encoder module 305 receives a source video 380. The source video 380 may be retrieved by the ingest server 106 and originally provided by a user or third party. In various embodiments, the source video 380 may have associated information that is also provided by the user or third party. For example, the associated information may include a classification of the video (i.e. "fast motion", "slow motion") provided in a video metadata file that is stored in the video store 120. The source video may have a standard video format (e.g. Audio Video Interleaved (AVI), Windows Media Video (WMV), Moving Picture Experts Group-4 (MPEG-4), Matroska Video (MKV)).

The intermediate video encoder module 305 transcodes the source video 380 into an intermediate video for further processing. Referring back to FIG. 2, in various embodiments, the intermediate video includes the individual video frames 210 as well as the original time 205 information (e.g., timestamps) associated with each video frame of the video frames 210. For example, the original time 205 information may provide instructions that frame 1 of the video frames 210 be played at a starting time $t_1$ for a duration of $(t_2-t_1)$, frame 2 be played at a starting time $t_2$ for a duration of $(t_3-t_2)$, and so on. The intermediate video encoder module 305 provides the video frames 210 and the original time 205 information to the still image selection module 315.

In various embodiments, the intermediate video encoder module 305 obtains information regarding the content of the source video 380 through the transcoding process as well as timing information corresponding to the content of the source video 380. For example, the intermediate video encoder module 305 identifies the content of the source video 380 via scene detection techniques, e.g., detecting an introduction scene, conversation scenes, action scenes, and other types of scenes. Additionally, the intermediate video encoder module 305 identifies the time at which each scene begins and the duration of each scene. The identified content and timing information of the source video 380 may also be provided to the still image selection module 315.

The still image selection module 315 selects a subset of video frames from the video frames 210 of the source video 380 as the selected still images 250 for compression. In some embodiments, the selection occurs based on a fixed pattern so that every Nth frame is selected. For example, as depicted in FIG. 2, every third frame (N=3) is selected via 215 as a still image of the selected still images 250. One skilled in art may appreciate that the fixed pattern does not need to be every third frame and can be more or less than that. FIG. 2 depicts the selection of the first, fourth, and seventh frame. In other examples, the still image selection module 315 may select the second, fifth, and eighth frames or the third, sixth, and ninth frames as the selected still images 250. The fixed pattern may be selected by a setting chosen by the video hosting service 150.

For example, in addition to receiving the video frames 210 and the original time 205 information, the still image selection module 315 also receives a video classification of the source video 380 from the video classification module 310. The video classification may indicate a complexity of video content in the source video 380. Therefore, in various embodiments, the still image selection occurs while taking into consideration the video classification provided by the video classification module 310. Generally, the video classification may be used to set a particular fixed interval instead of the every third frame depicted in FIG. 2.

One example classification of videos is "slow motion" videos, such as static music videos or music videos with infrequently changing lyrics. The slow motion videos are suitable for efficient delivery of compressed media because their visual quality is less likely to be degraded by being presented as still images (e.g. in a flip book format). In various embodiments, the still image selection module 315 can further refine the selection of still images such that source videos with a variety of classifications (e.g. fast motion, action movie, or any other classification type) can be played back without significantly degrading the viewing experience.

As a first example, a video classification may classify the source video 380 as a "slow motion" video, indicating that the source video 380 is non-complex. Therefore, the still image selection module 315 may select every fifth or every tenth frame as the selected still images 250 because fewer still images are required to visually capture what is occurring in the original source video 380. As another example, a video classification may classify the source video 380 as a "fast motion" video that is high in video complexity with rapidly changing scenes that occur from frame to frame. Therefore, the video hosting service 150 may select every other frame, as opposed to every fifth or tenth frame, as the selected still images 250 to more effectively capture the action.

In various embodiments, the original time 205 information for the video frames 210 is utilized to generate selected time 275 information for the selected still images 250. For example, the original video frames 210 may have a frame 1 played at a starting time $t_1$. Similarly, frame 2 is played at a starting time $t_2$ and so on for frames 3-9. After the selected still images 250 are selected via 215, the video hosting service 150 may associate the selected time 275 information with the selected still images 250, where the selected time 275 information is derived from the original time 205 information. For example, still image 1 255 is played at a starting time $t_1$, still image 2 260 is played at a starting time $t_4$, and still image 3 265 is played at a starting time $t_7$. The still images 255, 260, and 265 are each played for a duration of $(t_4-t_1)$, $(t_7-t_4)$, and $(t_{10}-t_7)$ respectively. In this embodiment, the time durations are the same because the frames are picked using a fixed pattern.

In other embodiments, the time durations for the still image 1 255, still image 2 260, and still image 3 265 may be different due to a variable selection pattern. For example, the still image selection module 315 may receive, from the intermediate video encoder module 305, the identified content information of the source video 380 (e.g. the introduction scene, the action scenes, the conversation scenes, and other scenes). The identified content information may provide an indication as to the complexity of each scene. The still image selection module 315 may set variable time intervals for each type of scene. For example, given that the introduction scene often displays the textual information in slow motion (e.g. title of video), the still image selection module 315 may select a low number of still images as the selected still images 250 (e.g. every twentieth frame). In one embodiment, the still image selection module 315 may select still images as the selected still images 250 from the action scenes, conversation scenes, and credits scenes at different time intervals. For example, every other video frame of the video frames 210 is selected for action scenes, every fifth frame is selected for conversation scenes, and every tenth frame is selected for the credits scene. These numbers are provided purely as examples and the implemented time intervals may be different than stated herein.

Regardless of the selection method, either fixed interval or varying interval, the motion information associated with the video frames, e.g., motion vectors associated with the video frames 210, may not be passed to the still image encoder module 330 for encoding, thus, saving computer resources from processing complicated motion information, e.g., motion estimation and motion compensation. The selected video frames are encoded by the still image encoder module 330 as still images.

The timing module 320 receives the selected time 275 information associated with the selected still images 250 selected by the still image selection module 315. For example, based on the example shown in FIG. 2, the timing module 320 receives selected time 275 information for initializing still image 1 at time $t_1$, still image 2 at time $t_4$ and still image 3 at time $t_7$. In various embodiments, the selected time 275 information received by the timing module 320 includes the starting time that corresponds to each selected still image 250. In other embodiments, the selected time 275 information received by the timing module 320 includes, in addition to the starting time for each selected still image 250, the time duration (e.g. $t_4-t_1$) for playing back each selected still image of the selected still images 250.

The audio module 325 receives the selected time 275 information from the timing module 320 to handle the associated audio file. The audio module 325 identifies portions of the original audio track/data that corresponds to the selected time 275 information and derives the audio data accordingly. Returning back to the example in FIG. 2, the audio data that was originally encoded to be played from original time $t_1$ *to* $t_4$ is identified because the selected time 275 information also corresponds to the time interval between $t_1$ and $t_4$. The identified audio data is then derived and associated with the time interval $t_1$ to $t_4$ for the selected time 275 information. Therefore, during playback, the audio data that was originally designed to play between time $t_1$ to $t_4$ in the source video 380 will be similarly played while still image 1 255 is played for its duration between $t_1$ and $t_4$. The derived audio data is encoded along with timing information (e.g. starting time and time duration) to produce an encoded audio 355 that is delivered to a client device. Any existing audio encoding techniques known to those of ordinary skill in the art, e.g., spectral analysis, discrete cosine transform (DCT), modified DCT (MDCT), predictive coding, can be used by the audio module 325 to encode the derived audio data for each selected still image of the selected still images 250.

The still image encoder module 330 receives the selected still images 250 from the still image selection module 315 and the selected time 275 information from the timing module 320. The still image encoder module 330 encodes the selected still images 250 with the selected time 275 information into encoded still images 350 to be delivered to a client device 110. The encoded format may be any standard format (e.g. H264, VP9). In various embodiments, the still image encoder module 330 may employ a lossless codec to generate the encoded still images 350 to maintain the original quality of the selected still images 250. In various embodiments, the still image encoder module 330 employs a lossy codec, e.g., Joint Photographic Expert Group (JPEG) codec, to further reduce the size of the encoded still images 350. In other embodiments, the still image encoder module 330 encodes the encoded still images 350 in a unique format (e.g. a .FLIP format).

In the embodiment as shown in FIG. 3, the audio module 325 and the still image encoder module 330 are individual modules that generate the encoded audio 355 and the encoded still images 350 respectively. In other embodiments, the audio module 325 and the still image encoder module 330 may be a single module that produces the encoded still images 350 and the encoded audio 355 in one file. The combined encoded still images and audio file may be referred to as a compressed media file. The compressed media file may be sent to the client device 110.

Decoding and Playback of Compressed Media

Figure 4:
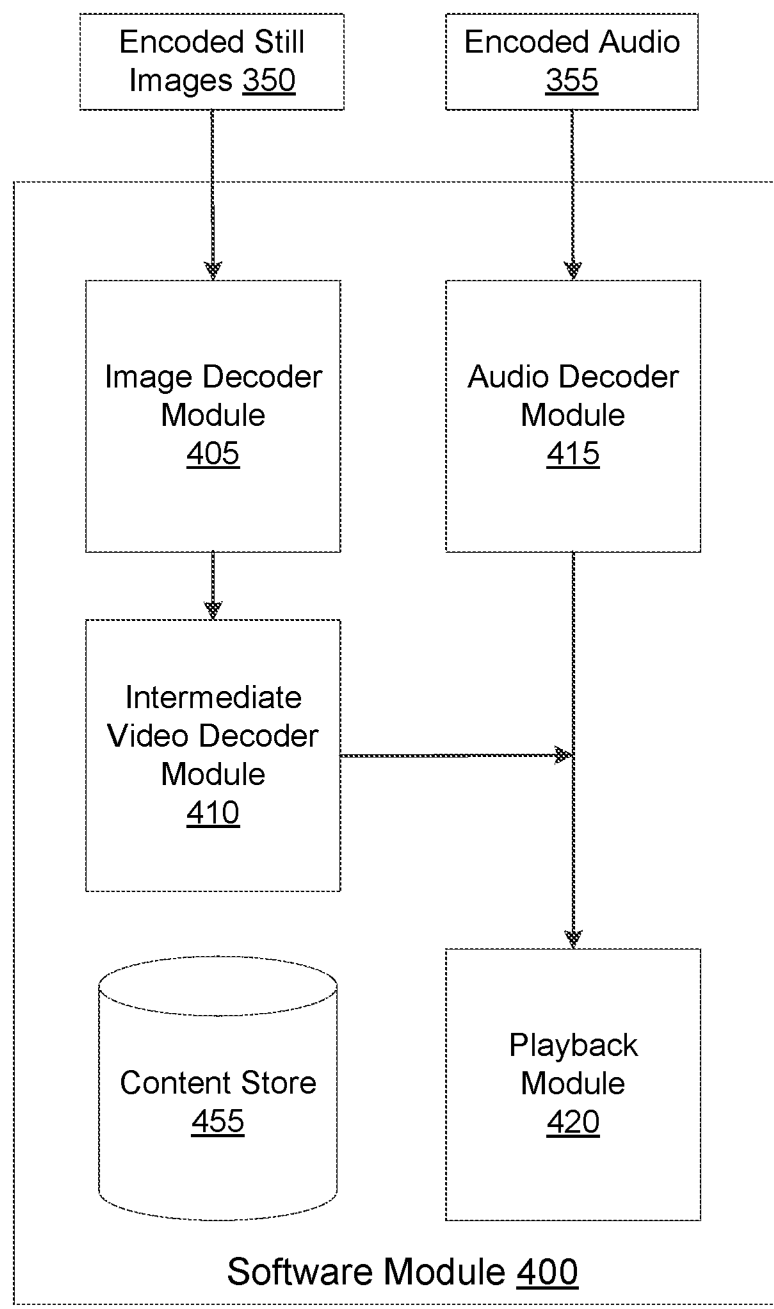
FIG. 4 is a flow diagram of a software module on a client device, in accordance with an embodiment.

FIG. 4 depicts a flow diagram of a software module 400 of the client device 110, in accordance with an embodiment. In various embodiments, the software module 400 may include an image decoder module 405, an intermediate video decoder module 410, an audio decoder module 415, and a playback module 420.

The image decoder module 405 decodes the received encoded still images 350 from the video hosting service 150 into decoded still images. The decoded still images are in an intermediate video format corresponding to the intermediate video format used by the intermediate video transcoder module 305 shown in FIG. 3. For example, the image decoder module 405 identifies the format of the encoded still images 350 and uses an appropriate video decoder to decode the encoded still images 350. The appropriate video decoder may correspond to the video encoder previously used by the still image encoder module 330 to encode the encoded still images 350. Additionally, through the decoding process, the image decoder module 405 also receives the selected time 275 information associated with the intermediate video.

The decoded still images and the selected time 275 information are provided to the intermediate video decoder module 410 to further decode the still images from the intermediate video format into a playable format. In various embodiments, the playable format may have the same format as the source video 380 (e.g. AVI, WMV, MP4, MKV). The playable format of the encoded still images 350 and the selected time 275 information may be stored in a content store 455.

In some embodiments, the intermediate video decoder module 410 may receive the still images in the intermediate video format and uses video interpolation methods to generate additional still images and inserts them between the received still images. Examples of video interpolation methods may include linear interpolation, and frame averaging. For example, the intermediate video decoder module 410 may receive a first still image and a second still image. The intermediate video decoder module 410 interpolates an additional still image from the first and second received still images by averaging the pixels from the first still image and the second still image to generate the additional still image, that is to be inserted between the first still image and the second still image. Similarly, the intermediate video decoder module 410 may generate additional still images from other received still images.

The intermediate video decoder module 410 may associate the appropriate timing information with each interpolated still image. For example, the intermediate video decoder module 410 may receive a first still image that is to be played at $t_1$ and a second still image that is to be played at $t_5$. Therefore, the first still image is intended to be played for a duration of $(t_5-t_1)$. The intermediate video decoder module 410 interpolates an additional still image from the first and second received still images as described above and may associate timing information that specifies the interpolated image to be played between the first and second still images. For example, the interpolated image is to be played at $t_3$. In other embodiments, the interpolated image may be associated timing information for it to be played at $t_2$ or at $t_4$. The intermediate video decoder module 410 creates an intermediate video with the received still images and the newly interpolated still images as well as their associated timing information. The intermediate video decoder module 410 then decodes the intermediate video into a playable format.

The audio decoder module 415 decodes the encoded audio data 355 received from the video hosting service 150. The audio decoder module 415 uses an audio decoder that corresponds to the audio encoder previously used by the audio module 325. Additionally, the audio decoder module 415 also receives the selected time 275 information associated with the encoded audio 355. The decoded audio data and associated selected time 275 information may be stored in the content store 455. In various embodiments, the audio decoder module 415 operates in parallel with the image decoder module 405 and/or intermediate video decoder module 410.

The playback module 420 receives the decoded still images in the playable format and associated selected time 275 information from the intermediate video decoder module 410. Additionally, the playback module 420 receives the decoded audio data and associated selected time 275 information from the audio decoder module 415. The playback module 420 plays the decoded still images and corresponding audio on the client device 110.

For example, returning to the example in FIG. 2, playback module 415 may play still image 1 255 at time $t_1$ for a duration of $(t_4-t_1)$. In parallel, the playback module 415 plays, at time $t_1$, a portion of the decoded audio data that also has the corresponding time information (e.g. starting time at $t_1$ and a duration of $(t_4-t_1)$). Once the duration $(t_4-t_1)$ elapses, the playback module 415 plays still image 2 260 at time $t_4$ for a duration of $(t_7't_4)$. Correspondingly, the portion of audio data that has a starting time of $t_4$ and duration of $(t_7-t_4)$ is played in parallel. The playback module 415 repeats this process until all decoded still images and associated audio data is played.

Generation, Delivery, and Playback of Compressed Media

Figure 5:
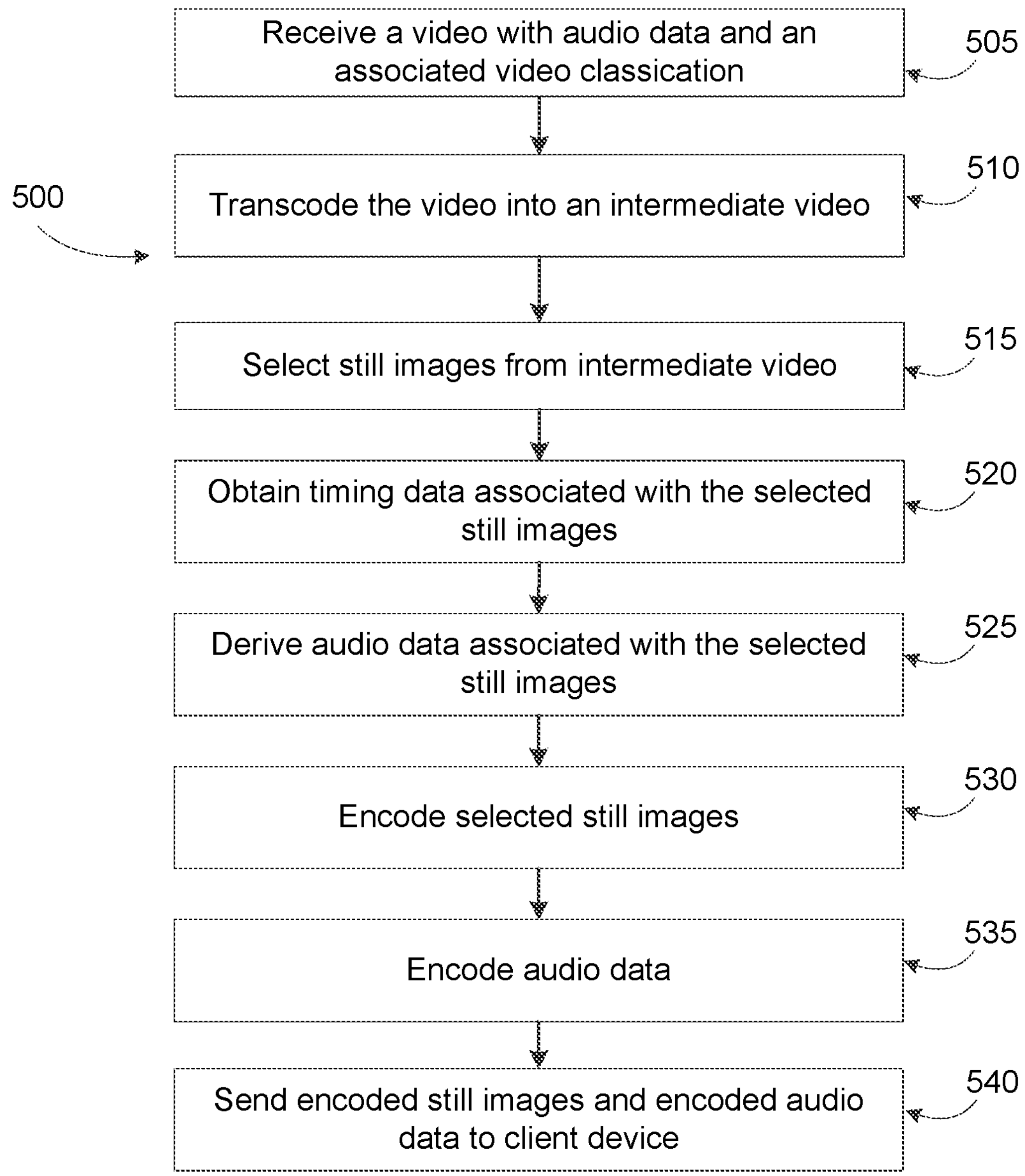
FIG. 5 is an example flow chart of generating compressed media for delivery to a client device, in accordance with an embodiment.
Figure 6:
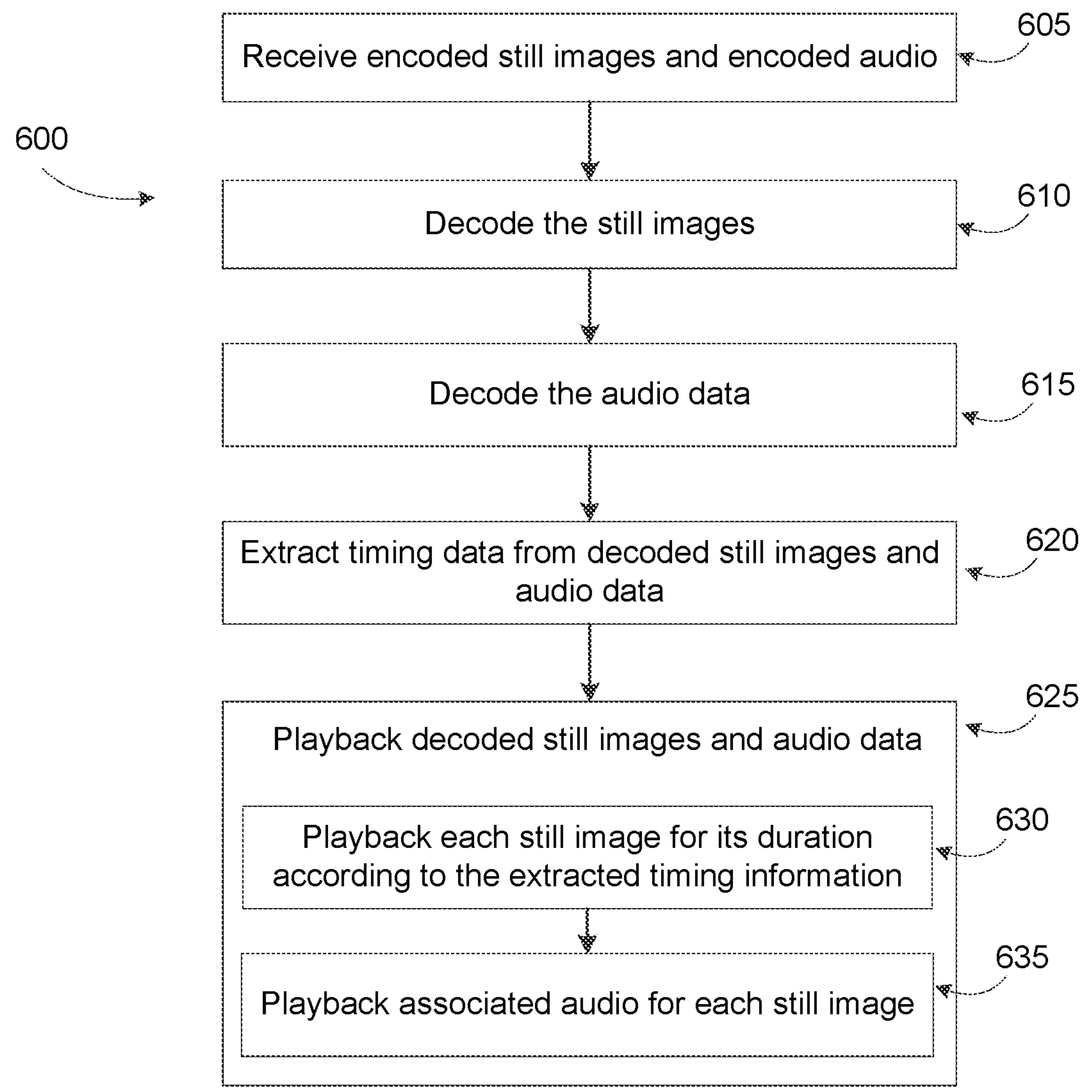
FIG. 6 is an example flow chart of playing back compressed media on a client device, in accordance with an embodiment.

In accordance with an embodiment, FIG. 5 and FIG. 6 depict process flowcharts for generating compressed media on the video hosting service 150 and playing the compressed media on a client device 110, respectively.

Referring now to FIGS. 1, 3 and 5 collectively, the video hosting service 150 receives via operation 505 a source video with audio data and, in various embodiments, associated video classification information. These videos and video classifications may be stored in the video store 120. The source video is provided to an intermediate video transcoder, e.g., the intermediate video transcoder module 305 shown in FIG. 3, which transcodes via operation 510 (i.e., decodes and encodes) the source video into an intermediate video for further processing. The still image selection module 315 selects via operation 515 a subset of video frames as still images from the intermediate video. In various embodiments, the selection process takes into consideration the associated video classification information. Based on the selected still images, the timing module obtains via operation 520 timing data associated with each selected still image. For example, the timing data may include a starting time for when the selected still image is to be played as well as a duration for that the selected still image is played for. The audio module 325 receives the original audio data associated with the source video 380 and derives via operation 525 audio data associated with the selected still images based on the timing data. The still image encoder module 330 encodes via operation 530 the still images with the timing data to generate encoded still images. The audio module 325 also encodes via operation 535 the derived audio data with the timing data to generate the encoded audio associated with the encoded still images. The video hosting service 150 sends via operation 540 the encoded still images and encoded audio data to a client device 110 through the network 130. Given that the encoded still images only possess a subset of the original video frames of the source video, transmitting the encoded still images through the network 130 requires significantly less resources (e.g. bandwidth, CPU processing power, power consumption) as compared to transmitting the source video itself or transmitting selected video frames encoded with motion data.

Referring now to FIGS. 1, 4, and 6 collectively, the client device 110 receives via operation 605 the encoded still images and corresponding encoded audio from the video hosting service 150. Additionally, the encoded still images and encoded audio have associated metadata that includes playback instructions or instructions for decoding the encoded still images or encoded audio. The image decoder module 405 of the client device 110 decodes via operation 610 the encoded still images while the audio decoder module 415 of the client device 110 decodes via operation 615 the encoded audio. In one embodiment, the encoded still images are decoded twice, first to decoded still images that are in an intermediate media format, and secondly to a playable version. The timing data that was previously encoded with the encoded still images and encoded audio is extracted via operation 620 and provided to the playback module 420 for playback via operation 625 that includes sub-operations 630 and 635. The playback module 420 uses the timing data to playback via the sub-operation 630 the decoded still images and audio data. More specifically, each still image is played at a starting time for a duration specified by the timing data. Additionally, while the still image is playing, the playback module 420 plays back via the sub-operation 635 the associated portion of the decoded audio data that corresponds to the still image.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

receiving a source video with corresponding source audio data, the source video comprising a plurality of video frames and the source audio data comprising a plurality of audio frames;

transcoding the source video into an intermediate video, the intermediate video comprising a plurality of transcoded video frames and associated time information;

selecting one or more video frames as still images from the plurality of transcoded video frames of the intermediate video;

obtaining timing data associated with each of the selected one or more still images, the timing data deriving from the associated time information of the intermediate video;

deriving audio data associated with the selected one or more still images from the plurality of audio frames using the obtained timing data;

sending the selected one or more still images and the derived audio data to a client device for playback.

2. The method of claim 1, wherein the selected one or more still images and the derived audio data are separately encoded prior to being sent to the client device for playback.

3. The method of claim 1, wherein selecting one or more video frames as still images from the plurality of transcoded video frames comprises:

selecting the one or more video frames as still images at a fixed time interval.

4. The method of claim 1, wherein selecting one or more video frames as still images from the plurality of transcoded video frames comprises:

receiving video classification information associated with the source video, the video classification information indicating a characteristic of content of the source video; and selecting the one or more video frames as still images based on the video classification information associated with the source video.

5. The method of claim 4, wherein the characteristic of content of the source video indicates a complexity of the video content in the source video.

6. The method of claim 4, further comprising:

responsive to the characteristic of content of the source video indicating that the source video has complex video content, selecting more video frames as still images than a threshold number of video frames for a fixed time interval.

7. The method of claim 4, further comprising:

responsive to the characteristic of content of the source video indicating that the source video has non-complex video content, selecting fewer video frames as still images than a threshold number of video frames for a fixed time interval.

8. The method of claim 1, wherein the obtained timing data associated with each of the selected one or more still images comprises a starting time and a duration that each still image is displayed for.

9. The method of claim 1, wherein deriving audio data associated with the selected one or more still images using the obtained timing data comprises:

for each selected still image:

identifying a portion of the source audio data that corresponds to a time interval in the obtained timing data associated with the selected still image; and associating the identified portion of the source audio data with the selected still image, wherein the identified portion of the source audio data has a starting time corresponding to a starting time of the selected still image and a duration corresponding to a duration of the selected still image.

10. A computer-implemented method comprising:

receiving, at a client device, an encoded still image file, an encoded audio file corresponding to the encoded still image file, and timing data associated with the encoded still image file and the encoded audio file;

decoding the encoded still image file to generate a decoded image file;

decoding the encoded audio file to generated a decoded audio file;

extracting a first timing data from the decoded image file and a second timing data from the decoded audio file using the timing data; and playing each decoded still image of the decoded image file according to the first timing data and playing the decoded audio file according to the second timing data.

11. The method of claim10, wherein playing each decoded still image of the decoded image file according to the first timing data and playing the decoded audio file according to the second timing data comprises:

for each decoded still image of the decoded image file:

deriving a starting time and duration from the first timing data associated with the decoded still image;

deriving a starting time and duration from the second timing data associated with audio data from the decoded audio file that corresponds to the decoded still image, wherein the starting time and duration derived from the second timing data are associated with the starting time and duration derived from the first timing data;

playing the decoded still image for the duration derived from the first timing data; and playing the audio data for the duration derived from the second timing data.

12. The method of claim 10, wherein decoding the encoded still images file to generate a decoded image file comprises:

decoding the encoded still images file to generate decoded still images in an intermediate media format;

decoding the generated decoded still images in the intermediate media format into a plurality of still images in a playable format.

13. A non-transitory computer-readable medium including computer program code, the computer program code when executed by a processor of a client device causing the processor to perform steps including:

receive a source video with corresponding source audio data, the source video comprising a plurality of video frames, and the source audio data comprising a plurality of audio frames;

transcode the source video into an intermediate video, the intermediate video comprising a plurality of transcoded video frames and associated time information;

select one or more video frames as still images from the plurality of transcoded video frames of the intermediate video;

obtain timing data associated with each of the selected one or more still images, the timing data deriving from the associated time information of the intermediate video;

derive audio data associated with the selected one or more still images from the plurality of audio frames using the obtained timing data;

send the selected one or more still images and the derived audio data to a client device for playback.

14. The non-transitory computer-readable medium of claim 13, wherein the selected one or more still images and the derived audio data are separately encoded prior to being sent to the client device for playback.

15. The non-transitory computer-readable medium of claim 13, wherein select one or more video frames as still images from the plurality of transcoded video frames comprises:

select the one or more video frames as still images at a fixed time interval.

16. The non-transitory computer-readable medium of claim 13, wherein select one or more video frames as still images from the plurality of transcoded video frames comprises:

receive video classification information associated with the source video, the video classification information indicating a characteristic of content of the source video; and select the one or more video frames as still images based on the video classification information associated with the source video.

17. The non-transitory computer-readable medium of claim 16, wherein the characteristic of content of the source video indicates a complexity of the video content in the source video.

18. The non-transitory computer-readable medium of claim 16, further comprising:

responsive to the characteristic of content of the source video indicating that the source video has complex video content, select more video frames as still images than a threshold number of video frames for a fixed time interval.

19. The non-transitory computer-readable medium of claim 13, wherein the obtained timing data associated with each of the selected one or more still images comprises a starting time and a duration that each still image is displayed for.

20. The non-transitory computer-readable medium of claim 13, wherein derive audio data associated with the selected one or more still images from the plurality of audio frames using the obtained timing data comprises:

for each selected still image:

identify a portion of the source audio data that corresponds to a time interval in the obtained timing data associated with the selected still image; and associate the identified portion of the source audio data with the selected still image, wherein the identified portion of the source audio data has a starting time corresponding to a starting time of the selected still image and a duration corresponding to a duration of the selected still image.

* * * * *